United States Patent [19]

Fujii et al.

[11] Patent Number: 4,481,336

[45] Date of Patent: Nov. 6, 1984

[54] OLEFINIC BLOCK COPOLYMERS OF ETHYLENE PROPYLENE AND 1-BUTENE

[75] Inventors: Masaki Fujii; Mitsutaka Miyabayashi, both of Yokkaichi, Japan

[73] Assignee: Mitsubishi Petrochemical Company Limited, Tokyo, Japan

[21] Appl. No.: 476,838

[22] Filed: Mar. 18, 1983

[30] Foreign Application Priority Data

Mar. 23, 1982 [JP] Japan ................................. 57-45800

[51] Int. Cl.$^3$ ........................................... C08F 297/08
[52] U.S. Cl. .................................. 525/323; 525/319; 525/324
[58] Field of Search ...................... 525/323, 321, 319

[56] References Cited

U.S. PATENT DOCUMENTS 3,959,409  5/1976  Frese et al. ........................ 525/323

FOREIGN PATENT DOCUMENTS 994416   6/1965  United Kingdom ............... 525/323
2075993 11/1981  United Kingdom ............... 525/323

Primary Examiner—Wilbert J. Briggs, Sr.
Attorney, Agent, or Firm—Oblon, Fisher, Spivak, McClelland & Maier

[57] ABSTRACT

A block copolymer comprising 60 to 95 parts by weight of a binary or tertiary random copolymer block A comprising propylene, ethylene and/or butene-1 and 5 to 40 parts by weight of a binary or tertiary random copolymer block B comprising butene-1, propylene and, optionally, ethylene. This block copolymer can be shaped into a film having excellent heat sealability, transparency and blocking resistance.

5 Claims, No Drawings

OLEFINIC BLOCK COPOLYMERS OF ETHYLENE PROPYLENE AND 1-BUTENE

BACKGROUND OF THE INVENTION

1. Technical Field

The present invention relates to novel olefinic block copolymers suitable for use as materials for the production of films having excellent heat sealability, transparency and blocking resistance.

Films made of polypropylene have been widely utilized as packaging material for foods, textiles and the like because they exhibit excellent mechanical, optical, and thermal properties. In the case where the polypropylene film is formed into a container such as a bag or it is sealed after packaging, the heat sealability of the film has a great influence on the packaging speed, the occurrence of imperfectly sealed products, a change in the quality of a packaged product and the like. Therefore, whether the polypropylene film is used as a single film or whether it is used as a composite film having a layer capable of being easily heat sealed on the surface thereof, there is a strong demand for improvement of the heat sealability of the film.

Furthermore, the heat sealability of a film is closely related to the melting/crystallizing property of the resin of which the film is made. It is known that the lower the melting or crystallizing temperature, the lower is the heat seal temperature at which the desired seal strength is obtained.

On the other hand, among the properties required for a packaging film, for example, the blocking property tends to become inferior as the heat sealability is improved. The main point of technical improvement is that the heat sealability of the film be improved without deterioration of the blocking resistance thereof.

Moreover, a packaging film is required to be amply transparent. Even if the heat sealability of the film can be improved at the expense of the transparency thereof, the resultant film will be of a low commercial value.

2. Prior Art

Heretofore, a number of crystalline random copolymers of propylene and ethylene have been proposed as resins for polypropylene films having good heat-sealability.

For example, U.S. Pat. No. 3,671,383 and Japanese Patent Publication No. 49-14343 disclose examples of a copolymer of propylene and ethylene which contain at least 75% of propylene or a crystalline random copolymer of propylene and ethylene which contains 1 to 6% of ethylene. However, with these copolymers, the heat seal temperature applied to obtain a heat seal strength necessary for practical purposes is not sufficiently low. In addition, as the ethylene content is increased, the heat sealability is certainly improved to a slight degree, but the blocking resistance rapidly deteriorates. Therefore, such a copolymer is useless for practical purposes. Moreover, the transparency begins to become inferior.

The quantities set forth above as well as others herein expressed in percent (%) and other quantities herein expressed in "part(s)" are by weight unless otherwise indicated.

U.S. Pat. No. 4,252,851 discloses that a copolymer of propylene and a $C_{4-10}$ α-olefin, preferably, butene-1, which has a propylene content of 80 to 95% based on the weight of the copolymer is preferable for an easily heat-sealable layer. Supplementary tests we carried out also revealed that a copolymer of propylene and butene-1 exhibited an improved heat sealability only when the butene-1 content is maintained at a high level of 10% or more. Even in this case, the heat seal temperature required to obtain a seal strength of 500 g per 20 mm width, as determined by the method of the present invention described hereinafter, is of the order of from 130° to 135° C. The transparency seemed to be equal to or slightly poorer than that of the propylene-ethylene copolymer.

Japanese Patent Application Laid-open No. 52-11281 states that a crystalline random copolymer comprising 86 to 98.9% of propylene, 1 to 10% of a straight-chain α-olefin other than propylene and 0.1 to 4.0% of ethylene is suitable for use as an easily heat-sealable layer. However, in accordance with the description of the examples and our supplementary tests, it seems that the invention described in this publication provides only a film having a heat seal temperature of 130° C. It was confirmed by our supplementary tests that if the ethylene and α-olefin contents are increased within the limits described in the publication in order to reduce the minimum heat sealable temperature, the nature of the copolymer particles deteriorates remarkably, and at the same time, the product film exhibits a remarkably high blocking property.

SUMMARY OF THE INVENTION

An object of the present invention is to solve the above described problems of the prior art and to obtain propylene copolymers suitable for use as material for producing films having excellent heat sealability, transparency and blocking resistance. The present invention has succeeded in attaining this object by providing a specific block copolymer.

More specifically, an olefinic block copolymer according to the present invention is characterized by being defined by the following conditions (1) and (2).

(1) The MFR (ASTM-D-1238(L)) of the olefinic block copolymer is in the range of from 0.01 to 200 [g/10 minutes].

(2) The olefine block copolymer contains 60 to 95 parts of binary or ternary random copolymer block (A) comprising propylene, ethylene and/or butene-1 and having a propylene content of 75 to 99%, an ethylene content of 0 to 7% and a butene-1 content of 0 to 25% and 5 to 40 parts of a binary or ternary random copolymer block (B) comprising butene-1, propylene and/or ethylene and having a butene-1 content of more than 25% but not more than 95%, a propylene content of not less than 5% but less than 75% and an ethylene content of 0 to 15%.

DETAILED DESCRIPTION OF THE INVENTION

1. Block Copolymer (1) Composition

The block copolymer according to the present invention contains 60 to 95 parts of a binary or ternary random copolymer block (A) comprising propylene, ethylene and/or butene-1 and having a propylene content of 75 to 99%, an ethylene content of 0 to 7% and a butene-1 content of 0 to 25% and 5 to 40 parts of a binary or ternary random copolymer block (B) comprising butene-1, propylene and/or ethylene and having a butene-1 content of more than 25% but not more than 95%, a propylene content of not less than 5% but less than 75%, and an ethylene content of 0 to 10%.

The block copolymer of the present invention need not always comprise one copolymer block (A) and one copolymer block (B), respectively, but it may comprise one or more of either of these blocks. Also, the arrangement of the blocks is not limited to a specific type.

Furthermore, the block copolymer of the present invention may comprise, in addition to the above described copolymer blocks (A) and (B), other olefin polymer or copolymer block, for example, a propylene homopolymer block. The additional block may be formed before, during or after the production of the block (A) or (B).

The proportion of the additional block in the block copolymer of the present invention is at most 50 parts, preferably, 15 parts, more preferably, 8 parts, with respect to 100 parts of the sum of the copolymer block A and the copolymer block (B).

The block copolymer of the present invention contains, in one polymer molecular chain, a homopolymer or copolymer block of a specific composition in coexistent combination with a copolymer block of a different composition, a physical mixture of the molecular chains of these two blocks, or a mixture of these combination and mixture of the two blocks.

The proportion of the block (A) in the block copolymer of the present invention is 60 to 95 parts, preferably, 65 to 90 parts, more preferably, 70 to 85 parts. We have found that, if the block (A) content exceeds the upper limit, the low temperature heat sealability of the resultant film is not significantly improved. Also, if the block (A) content is less than the lower limit, the resultant film exhibits a poor blocking resistance.

The contents attributable to each olefin constituting the block (A) are shown in the following table.

| | Mode of practice | | | |
|---|---|---|---|---|
| Olefin | General mode | Preferable mode | More preferable mode | Particularly preferable mode |
| Propylene (wt %) | 75-99 | 80-98 | 85-97 | 85-94.2 |
| Ethylene (wt %) | 0-7 | 0-6 | 0-5 | 0.8-4 |
| Butene-1 (wt %) | 0-25 | 0-20 | 0-15 | 5-15 |

If the propylene content exceeds the upper limit, the resultant film exhibits poor heat sealability. Inversely, if the propylene content is less than the lower limit, the blocking property of the resultant film becomes a problem. With regard to the ethylene and butene-1 contents, each content exceeding the upper limit causes the resultant film to exhibit unsatisfactory blocking resistance.

The proportion of the block (B) in the block copolymer of the present invention is 5 to 40 parts, preferably 10 to 35 parts, more preferably 15 to 30 parts. The contents attributable to each olefin constituting the block (B) are shown in the following table.

| | Mode of practice | | |
|---|---|---|---|
| Olefin | General mode | Preferable mode | More preferable mode |
| Butene-1 (wt %) | more than 25 but not more than 95 | 30-90 | more than 40 to 85 |
| Propylene (wt %) | not less than 5 but less than 75 | 10-70 | 15 to less than 60 |
| Ethylene (wt %) | 0-10 | 0-0.5 | 0-0.5 |

Other preferable modes are as follows.

| | Mode of practice | |
|---|---|---|
| Olefin | Preferable mode | More preferable mode |
| Butene-1 (wt %) | more than 25 but not more than 60 | more than 25 but not more than 50 |
| Propylene (wt %) | 33 to less than 75 | 45-69 |
| Ethylene (wt %) | 0.5-7 | 0.5-5 |

When the butene-1 content is less than the lower limit and the propylene content exceeds the upper limit, the resultant film exhibits poor heat sealability. When the butene-1 content exceeds the upper limit and the propylene content is less than the lower limit, the resultant film exhibits poor transparency and heat sealability. When the ethylene content exceeds the upper limit, the blocking property of the resultant film becomes a problem.

(2) Molecular weight

The molecular weight of the block copolymer should be such that the MFR (ASTM-D-1238(L)) is in the range of from 0.01 to 200 [g/10 minutes]. If the MFR exceeds the upper limit, extrusion will be difficult, and the resultant film will exhibit low strength. If the MFR is less than the lower limit, the melt-flow property will be poor, and the extrusion will be difficult.

In order to obtain a more preferable moldability and film strength, the MFR is preferably more than 0.1 but not more than 100.

2. Production of Block Copolymer

The novel block copolymer of the present invention is obtained by previously random copolymerizing propylene, ethylene and/or butene-1 to prepare a copolymer block (A) and then, by random copolymerizing butene-1, propylene and/or ethylene in the presence of the copolymer (A) to prepare a copolymer block (B).

Also, inversely, after the copolymer block (B) is prepared, the copolymer block (A) may be prepared in the presence of the copolymer block (B).

In the production of the block copolymer of the present invention, it is preferable that, when the copolymer block (A) is prepared, 60 to 99% of propylene, 0 to 7% of ethylene and 0 to 40% of butene-1 be fed and that when the copolymer block (B) is prepared, 5 to 60% of propylene, 0 to 10% of ethylene and more than 40% but not more than 98% of butene-1 be fed.

The copolymer of the present invention is ordinarily prepared by using a stereospecific polymerization catalyst consisting mainly of a titanium component and an organoaluminum compound. The titanium component preferably is α, β, γ, or δ type titanium trichloride, and a titanium compound supported on a carrier such as magnesium chloride. Among titanium trichlorides, when titanium trichloride prepared by extracting and removing aluminum chlorides from titanium trichloride (the main component being considered to be an eutectic composite), which is obtained by reducing titanium tetrachloride with an organoaluminum, by using a complexing agent, is subjected to an activation treatment by any suitable manner and is used as the titanium component for the catalyst, the compositional distribution in each random copolymer block is more random than in the case where other titanium trichlorides are used, and the resultant film appears to exhibit more desirable properties.

Where a higher yield of the block copolymer per catalyst is desired, it is preferable to use titanium trichloride or titanium tetrachloride supported on a carrier such as magnesium chloride.

As the organoaluminum compound, a compound of the formula: $AlR_aY_{3-a}$ is preferably used. In the above formula: a is in the range of $0 < a \leq 3$; Y represents a halogen atom; and R represents a $C_{1\text{-}18}$ hydrocarbon residue, preferably, a member selected from alkyl radicals and aryl radicals. Preferable examples of the organoaluminum compound are triethylaluminum and diethylaluminum chloride.

A catalyst comprising a combination of these two essential components may contain, as a third component, a small amount of an electron donor. An electron donor usable for the catalyst may be selected from organic acid esters, ethers, amines, alcohols, ketones, aldehydes and phenols.

The polymerization condition may be optionally varied depending on the required catalyst and the monomeric composition as long as the objects of the present invention can be attained. For example, the polymerization temperature is ordinarily in the range of 30° to 100° C., preferably, 40° to 85° C., most preferably, 50° to 70° C.

3. Utilization of Copolymer

A film prepared from the block copolymer of the present invention is heat sealable at a temperature of 120° C. or less, preferably, 110° C. or less, particularly, about 100° C., and has excellent transparency and blocking resistance.

The coplymer of the present invention is used as a packaging film for foods, vegetables and the like or as a composite film with a film made of other resins, for example, a propylene homopolymer.

The film is formed by casting, inflating, calendering, or like process.

The film may be in a stretched state. However, it is preferable that the film composed of the copolymer of the present invention not be substantially oriented. When the film is oriented, shrinkage may occur at a sealed portion of the film during heat sealing, which may result in a poor appearance of the film.

Therefore, in the case where high film strength is required, it is preferable that a composite film comprising an oriented film base and a low temperature heat sealable film of the copolymer of the present invention which is not substantially oriented and which is laminated on the film base, be used instead of a single film.

Such a composite stretched film is obtained by subjecting the copolymer of the present invention and the other resin to co-extrusion and by subjecting the resultant laminated film to a stretching procedure at a temperature equal to or above the melting point of the copolymer but below the melting point of the other resin.

Furthermore, the composite stretched film can be obtained by laminating a film consisting of the copolymer of the present invention on a film consisting of another resin which has been previously stretched in the longitudinal direction, and by laterally stretching the resultant laminate at a temperature above the melting point of the copolymer but below the melting point of the other resin by using a tenter.

In addition, the composite stretched film can be obtained by laminating a film consisting of the copolymer of the present invention on a biaxially stretched film consisting of another resin.

In these cases, the "other resin" preferably is a thermoplastic resin having a melting point of 145° C. or more, and includes, in addition to the above-mentioned propylene homopolymer, copolymers of propylene and other α-olefins, polyamides, polycarbonates and polyethylene terephthalate.

The film thickness is 10 to 260μ, preferable, 15 to 60μ, for a single layer film, and, in the case of a composite film, is 0.2 to 60μ, preferably, 0.5 to 20μ, for the superficial layer, and 15 to 250μ, preferably, 20 to 100μ, for the base layer consisting of the other resin. In the case of a composite film, the total thickness is 16 to 260μ, preferably 21 to 60μ.

The stretching ratio is 2.3 or more, preferably, 4 to 16, at least in a uniaxial direction.

The present invention is illustrated in detail below with respect to experimental examples.

4. Experimental Examples

In the following examples and comparative examples, unless otherwise indicated, the testing methods used for the evaluation of each product are as follows.
(1) Melt flow rate (MFR) (230° C., 2.16 kg)
ASTM-D-1238 (condition L) [g/10 minutes]
(2) Heat seal temperature Two film samples sandwiched between two teflon films having a thickness of 0.1 mm were placed between two hot plates of a II type heat sealer manufactured by Toyo Seiki Co., Ltd., Japan, and the samples were heat-bonded to each other at the hot plate temperature under a pressure of 1 kg/cm² for 1 second. (the width of the sealed portion: 20 mm).

The heat-bonded film sample was cut into test specimens each of a width of 2 cm and a length of 10 cm. In a similar manner, specimens were prepared by varying the hot plate temperature.

These specimens were measured for their 180° peeling strength by using a shopper tensile testing machine, manufactured by Toyo Seiki Co., Ltd., at a tensioning speed of 500 mm/minute.

The hot plate temperature required for preparing a specimen exhibiting a 180° peeling strength of 500 g/2 cm width, is called the heat seal temperature (°C.).
(3) Haze (degree of haze of a film)

According to Japanese Industrial Standard JIS P-8138. A specimen composed of four sample films placed one on top of another was prepared for this determination.
(4) Blocking Two films placed one on top of the other were loaded with a load of 50 g/cm² and were stored in a room at a temperature of 40° C. and a relative humidity of 10% for one day. The resultant specimen (20 mm × 120 mm) was tested by using a Shopper type tensile testing machine, manufactured by Toyo Seiki Co., Ltd., at a tensioning speed of 500 mm/minute to determine the maximum stress (g/10 cm$^2$) required to peel the bonded surfaces of the films by a shearing force.

EXAMPLE A1

A stainless-steel reactor having an internal volume of 10 l and provided with agitating blades was thoroughly purged with propylene gas. 4.1 l of heptane was introduced into the reactor. The inner temperature was maintained at 30° C. As a catalyst, 1.95 g of diethylaluminum chloride (DEAC) and 0.65 g of titanium trichloride ("THB-19", manufactured by Marubeni Sorbey Chemical Co., Ltd., Japan) were added to the heptane. Subsequently, propylene and hydrogen were fed into the reactor at rates of 300 g/hour and 0.5 l/hour (in terms of STP; this applies also to the following), respectively, while rapidly increasing the inner temperature to 55° C. 15 minutes after the feeding of the propylene and hydrogen was started, ethylene was fed into the reactor at a rate of 14.0 g/hour. When the amount of the propylene fed reached 1,215 g, the feeding of the propylene, ethylene and hydrogen was stopped, and the nonreacted gas was discharged from the reactor until the inner pressure of the reactor was 0.4 kg/cm$^2$ (gauge pressure. In the follow, all pressures are in terms of gauge pressure) (The above is block A (propylene-/ethylene binary random copolymer)).

Then, propylene, butene-1 and hydrogen were fed into the reactor at rates of 120 g/hour, 700 g/hour and 0.2 l/hour, respectively. When the amount of butene-1 fed was 350 g, the feeding of the butene-1 was stopped. Also, when the amount of propylene fed was 240 g, the feeding of the propylene and hydrogen was stopped (The above is block B (propylene/butene-1 binary random copolymer)).

The resultant block copolymer was refined by using an alcohol and then dried to provide a product.

The block copolymer and the proportion and the composition of each block constituting the block copolymer, and the physical properties of the block copolymer are indicated in Table 1. Since the proportion and the composition of each block cannot be easily determined only by this experiment, polymerization was separately carried out under the same conditions as described above, and the polymerization procedure was discontinued before its completion, whereupon the catalyst was immediately decomposed. Then, the same refining and drying procedures were repeated so as to obtain a polymer. The weight and composition of the polymer were determined. Under the assumption that these measurements apply to the polymerization product at each polymerization step of this example, the proportion and the composition of each block were determined indirectly from these measured values. The composition was determined by means of carbon 13 NMR.

EXAMPLE A2

A block copolymer was prepared according to the procedure described in Example A1 except that in the production of the block A, the quantity of propylene fed was 1,440 g, and that, in the production of the block B, the quantity of propylene fed was 180 g, and the rate and quantity of butene-1 fed were 600 g/hour and 300 g, respectively.

The results are shown in Table 1.

EXAMPLE A3

A block copolymer was prepared according to the procedure described in Example A1 except that, in the production of the block A, as a monomer other than the propylene and ethylene, butene-1 was fed, that the feed rate of the ethylene was 5.6 g/hour, that the feeding of the butene-1 was started simultaneously with the feeding of the ethylene, and that the feed rate of the butene-1 was 108 g/hour.

The results are shown in Table 1.

EXAMPLE A4

A block copolymer was prepared according to the procedure described in Example A3 except that, in the production of the block A, the quantity of propylene fed was 1,440 g, the feeding of the ethylene and butene-1 was started simultaneously with the feeding of the propylene, and the feed rate of the ethylene was 5.5 g/hour, and that, in the production of the block B, as a monomer other than the propylene and butene-1, ethylene was fed, the quantity of propylene fed was 180 g, the feed rate and quantity of the butene-1 were 500 g/hour and 250 g, respectively, and the feed rate and quantity of the ethylene were 0.96 g/hour and 1.43 g, respectively.

EXAMPLE A5

The production of a block copolymer was carried out by first producing a block B and then, by producing a block A.

In the production of the block B, propylene, butene-1 and hydrogen were simultaneously fed at rates of 120 g/hour, 700 g/hour and 0.3 l/hour, respectively. When the quantity of butene-1 fed was 350 g, the feeding of the butene-1 was stopped. When the quantity of propylene fed reached 240 g, the feeding of both the propylene and hydrogen was stopped.

The block A was a binary random copolymer comprising the non-reacted monomer consisting mainly of the butene-1 and newly fed propylene. The production of the block A was carried out by feeding, subsequently to the production of the block B, propylene and hydrogen into the reaction system at rates of 360 g/hour and 0.2 l/hour, respectively, until the quantity of propylene fed reached 1,215 g.

Other conditions were the same as those described in Example A1. Thus, a block copolymer was obtained.

The results are shown in Table 1.

EXAMPLE A6

A block copolymer was prepared under the same conditions as those described in Example A4, except that in the production of the block (A), 15 minutes after the propylene was fed, the butene-1 and the ethylene were fed at rates of 95 g/hour and 5.4 g/hour, respectively, and in the production of the block (B), the rate and quantity of butene-1 fed were 400 g/hour and 200 g, respectively, and the rate and quantity of ethylene fed were 2.2 g/hour and 3.3 g, respectively.

COMPARATIVE EXAMPLE A1

A block copolymer was prepared according to the procedure described in Example A1 except that, in the production of the block B, the feed rates of the propylene, the butene-1 and the hydrogen were 200 g/hour, 130 g/hour and 0.3 l/hour, respectively, and the quantities of propylene and butene-1 fed were 400 g and 130 g, respectively.

The results are shown in Table 1.

COMPARATIVE EXAMPLE A2

A block copolymer was prepared according to the procedure described in Example A1 except that, in the production of the block B: as a monomer other than the propylene and the butene-1, ethylene was fed; the feed rates of the butene-1 and the ethylene were 480 g/hour and 14.2 g/hour, respectively; the quantities of butene-1 and ethylene fed were 240 g and 28.4 g, respectively; and the feed rate of the hydrogen was 0.35 l/hour.

The results are shown in Table 1.

COMPARATIVE EXAMPLE A3

A block copolymer was prepared according to the procedure described in Example A2 except that, in the production of the block A, the quantity of propylene fed and the feed rates of the ethylene and the hydrogen were 1,370 g, 27.0 g/hour and 0.7 l/hour, respectively.

The results are shown in Table 1.

COMPARATIVE EXAMPLE A4

A block copolymer was prepared according to the procedure described in Example A3 except that, in the production of the block A: the rate and quantity of propylene fed were 240 g/hour and 800 g, respectively; the feed rate of the ethylene was 3.7 g/hour; the rate and quantity of butene-1 fed were 800 g/hour and 800 g, respectively; and the feed rate of the hydrogen was 0.4 l/hour.

The results are shown in Table 1.

EXAMPLES B1 THROUGH B5

100 parts by weight of the block copolymers prepared in Examples A1 through A5 was mixed with 0.1 part by weight of 2,6-di-t-butyl-4-methylphenol (antioxidant), 0.15 part by weight of powdered silica (antiblocking agent), and 0.06 part by weight of erucinic amide (slip agent). The resultant composition was melt-mixed by using an extruder having a screw diameter of 50 mm and extruded at a temperature of 240° C. to produce an extrudate in the form of a strand. Then, the strand was water-cooled. The strand was cut into pellets having a diameter of from 2 to 3 mm.

Polypropylene "Mitsubishi Noblen FL6" (trade name, of a limiting viscosity of 2.3 dl/g measured in a decalin solution at a temperature of 130° C., manufactured by Mitsubishi Yuka Co., Ltd., Japan) and the above-prepared pellets were fed into a three layer coextruder and extruded therethrough at a die temperature of 240° C. in such a manner that the base layer consisted of the polypropylene and the upper and lower surface layers consisted of the above-mentioned block copolymer composition, thereby obtaining a three-layered film.

After the film was cooled until the surface temperature was about 40° C., it was longitudinally stretched at a stretching ratio of 5 at a temperature of about 115° C. by using a pair of heated rolls. Then the stretched film was fed into an oven maintained at a temperature of approximately 160° to 165° C. and was laterally stretched at a stretching ratio of 9 by using a tenter, thereafter being heat-set in an oven at a temperature of about 158° C. Thereafter, the lug portions of the film were slit so as to obtain a packaging film having a thickness of the upper and lower surface layers of 1μ and a thickness of the base layer of 30μ.

The quality of the packaging film is shown in Table 2. The heat seal temperature shown in Table 2 indicates the temperature of the hot plate at which a specimen having a strength of 100 g/2 cm width is obtained.

COMPARATIVE EXAMPLES B1 THROUGH B4

The same film shaping procedure and the same quality evaluation as those described in Examples B1 through B5 were repeated except that the block copolymers prepared in Comparative Examples A1 through A4 were used in place of the block copolymers prepared in Examples A1 through A5.

The results are shown in Table 2.

TABLE 1

| | | Ex. A1 | Ex. A2 | Ex. A3 | Ex. A4 | Ex. A5 | Com. Ex. A1 | Com. Ex. A2 | Com. Ex. A3 | Com. Ex. A4 | Ex. A6 |
|---|---|---|---|---|---|---|---|---|---|---|---|
| Block A | Content (%) | 69.5 | 84.6 | 70.4 | 85.1 | 69.3 | 70.2 | 69.4 | 85.1 | 70.3 | 87.2 |
| | M F R (g/10 minutes) | 5.7 | 5.6 | 5.2 | 5.4 | — | 5.8 | 5.9 | 5.6 | 6.1 | 5.6 |
| | Propylene content (%) | 95.8 | 95.5 | 84.1 | 84.6 | 80.2 | 95.8 | 95.7 | 91.4 | 67.7* | 86.9 |
| | Ethylene content (%) | 4.2 | 4.5 | 1.7 | 1.6 | — | 4.2 | 4.3 | 8.6* | 1.7 | 1.5 |
| | Butene-1 content (%) | — | — | 14.2 | 13.8 | 19.8 | — | — | — | 30.6* | 11.3 |
| Block B | Content (%) | 30.5 | 15.4 | 29.6 | 14.9 | 30.7 | 29.8 | 30.6 | 14.9 | 29.7 | 12.8 |
| | M F R (g/10 minutes) | — | — | — | — | 6.1 | — | — | — | — | — |
| | Propylene content (%) | 58.4 | 56.5 | 57.7 | 65.8 | 61.3 | 82.8 | 57.8 | 59.3 | 53.3 | 71.2 |
| | Ethylene content (%) | — | — | — | 0.7 | — | — | 12.8* | — | — | 2.0 |
| | Butene-1 content (%) | 41.6 | 43.5 | 42.3 | 34.2 | 38.7 | 17.2* | 29.4 | 40.7 | 46.7 | 27.0 |
| Final block copolymer | M F R (g/10 minutes) | 6.2 | 6.3 | 5.7 | 6.1 | 6.4 | 5.9 | 5.7 | 5.9 | 6.2 | 6.3 |
| | Propylene content (%) | 84.4 | 89.5 | 76.3 | 81.8 | 74.4 | 92.0 | 84.1 | 86.6 | 63.4 | 85.0 |
| | Ethylene content (%) | 2.9 | 3.8 | 1.2 | 1.4 | — | 2.9 | 6.9 | 7.3 | 1.2 | 1.6 |
| | Butene-1 content (%) | 12.7 | 6.7 | 22.5 | 16.8 | 25.6 | 5.1 | 9.0 | 6.1 | 35.4 | 13.3 |

*Outside the scope of the claim.

TABLE 2

| | Ex. B1 | Ex. B2 | Ex. B3 | Ex. B4 | Ex. B5 | Com. Ex. B1 | Com. Ex. B2 | Com. Ex. B3 | Com. Ex. B4 | Ex. B6 |
|---|---|---|---|---|---|---|---|---|---|---|
| Heat seal temperature (°C.) | 86 | 98 | 81 | 93 | 80 | 123 | 86 | 93 | 77 | 94.2 |
| Haze (superimposed four films) (%) | 5.6 | 5.7 | 5.4 | 5.8 | 5.7 | 7.2 | 14.3 | 6.3 | 5.1 | 5.7 |
| Blocking (g/10 cm²) | 120 | 80 | 100 | 65 | 60 | 70 | 710 | 980 | 670 | 72 |

What we claim is:

1. An olefinic block copolymer characterized by being defined by the following conditions (1) and (2):
   (1) the MFR (ASTM-D-1238) (L)) of said olefinic block copolymer is in the range of from 0.01–200 g/10 min.; and
   (2) said block copolymer comprises 60–95 parts by weight of a ternary random copolymer (A) comprising 85–94.2% by weight of propylene, 0.8–4% by weight of ethylene and 5–15% by weight of butene-1, and 5–40 parts by weight of a binary or ternary random copolymer block (B) comprising 30–90% by weight of butene-1, 10–70% by weight of propylene and 0–0.5% by weight of ethylene.

2. The olefinic block copolymer of claim 1, wherein said copolymer block (A) is a ternary random copolymer block comprising 85–94.2% by weight of propylene, 0.8–4% by weight of ethylene and 5–15% by weight of butene-1, and said copolymer block (B) is a binary or ternary random copolymer block comprising more than 40, but not more than 85% by weight of butene-1, not less than 15, but less than 60% by weight of propylene and 0–0.5% by weight of ethylene.

3. An olefinic block copolymer characterized by being defined by the following conditions (1) and (2):
   (1) the MFR (ASTM-D-1238) (L)) of said olefinic block copolymer is in the range of from 0.01–200 g/10 min.; and
   (2) said block copolymer comprises 60–95 parts by weight of a ternary random copolymer block (A) comprising 85–94.2% by weight of propylene, 0.8–4% by weight of ethylene and 5–15% by weight of butene-1, and 5 to 40 parts by weight of a binary or ternary random copolymer block (B) comprising more than 25, but not more than 60% by weight of butene-1, not less than 33, but less than 75% by weight of propylene and 0.5–7% by weight of ethylene.

4. An olefinic block copolymer characterized by being defined by the following conditions (1) and (2):
   (1) the MFR (ASTM-D-1238 (L)) of said olefinic block copolymer is in the range of from 0.01–200 g/10 min.; and
   (2) said block copolymer comprises 65–90 parts by weight of a ternary random copolymer (A) comprising propylene, ethylene and butene-1, and having a propylene content of 85–94.2% by weight, an ethylene content of 0.8–4% by weight and a butene-1 content of 5–15% by weight, and 10–35 parts by weight of a binary or ternary random copolymer block (B) comprising more than 40 but not more then 85% by weight of butene-1, not less than 15 but less than 60% by weight of propylene and 0–0.5% by weight of ethylene.

5. The olefinic block copolymer of claim 4 wherein said copolymer block (A) is a ternary random copolymer block comprising 85–94.2% by weight of propylene, 0.8–4% by weight of ethylene and 5–15% by weight of butene-1, and said copolymer block (B) is a ternary random copolymer block comprising more than 25 but not more than 60% by weight of butene-1, no less than 33 but less than 75% by weight of propylene and 0.5–7% by weight of ethylene.

* * * * *